(12) United States Patent
Ketchum

(10) Patent No.: US 7,878,700 B2
(45) Date of Patent: Feb. 1, 2011

(54) POLYMER REMOVAL FROM A POLYMER MIXER

(75) Inventor: James R. Ketchum, Santa Fe, TX (US)

(73) Assignee: Equistar Chemicals, LP, Houston, TX (US)

( * ) Notice: Subject to any disclaimer, the term of this patent is extended or adjusted under 35 U.S.C. 154(b) by 379 days.

(21) Appl. No.: 12/284,630

(22) Filed: Sep. 23, 2008

(65) Prior Publication Data

US 2010/0074045 A1 Mar. 25, 2010

(51) Int. Cl.
*B01F 15/02* (2006.01)
(52) U.S. Cl. .......................... 366/77; 366/192
(58) Field of Classification Search ............... 366/77, 366/192, 193, 194, 195, 196; 222/504, 505, 222/510, 556, 557; 403/364
See application file for complete search history.

(56) References Cited

U.S. PATENT DOCUMENTS

| | | | | |
|---|---|---|---|---|
| 3,419,250 A | * | 12/1968 | Brennan, Jr. ............... | 366/196 |
| 3,577,105 A | * | 5/1971 | Jones, Jr. .................... | 333/239 |
| 4,200,208 A | * | 4/1980 | Hassenauer ................. | 222/505 |
| 4,380,397 A | * | 4/1983 | Hashizume et al. .......... | 366/77 |
| 4,572,674 A | * | 2/1986 | Mathis et al. ............... | 366/192 |
| 5,090,815 A | * | 2/1992 | Bohle ......................... | 366/192 |
| 6,217,251 B1 | * | 4/2001 | Kato et al. .................. | 403/341 |
| 6,280,074 B1 | * | 8/2001 | Kuroda et al. .............. | 366/76.3 |
| 6,416,415 B1 | * | 7/2002 | Yu .............................. | 464/42 |
| 6,857,247 B2 | * | 2/2005 | Adams ....................... | 52/656.9 |
| 7,392,988 B2 | | 7/2008 | Moldt et al. | |
| 7,637,650 B2 | * | 12/2009 | Ueda et al. .................... | 366/77 |
| 2005/0196231 A1 | * | 9/2005 | McKay et al. ............... | 403/364 |
| 2010/0074045 A1 | * | 3/2010 | Ketchum ..................... | 366/77 |

* cited by examiner

*Primary Examiner*—Charles E Cooley
(74) *Attorney, Agent, or Firm*—Roderick W. MacDonald

(57) ABSTRACT

A method and apparatus for controlling the removal of polymer from a mixer using an outlet gate that is coupled to an actuator by way of a pair of flanges, one flange carrying a protuberance and the other flange carrying a depression into which the protuberance fits in a sliding manner.

8 Claims, 3 Drawing Sheets

POLYMER REMOVAL FROM A POLYMER MIXER

BACKGROUND OF THE INVENTION

1. Field of the Invention

This invention relates to the removal of molten polymer from a polymer mixer. More specifically, this invention relates to the removal of molten polyethylene from a continuous polymer mixer.

2. Description of the Prior Art

Although, for sake of clarity and brevity, this invention is described in terms of conveying molten polyethylene, this invention is not limited to that type of polymer.

Ethylene is polymerized to polyethylene homopolymers and co-polymers by a number of different processes to make different polymeric products such as low density polyethylene, high density polyethylene, and linear low density polyethylene which exhibits favorable characteristics found in both low density and high density polyethylene. For sake of example only, this invention is described herein primarily in terms of a slurry phase (suspension) polymerization process for making high density polyethylene (HDPE).

The slurry polymerization process typically takes place in a closed loop (horizontal or vertical) reactor using a hydrocarbonaceous solvent such as n-hexane, isobutane, isopentane, and the like. The essentially liquid feed mixture of ethylene, co-monomer(s), if any, catalyst, and any additives is continuously pumped in a loop while the polymerization reaction takes place.

The process can employ known catalyst systems such as a silica-supported chromium/aluminum catalyst with or without a co-catalyst such as triethyleborane, or Ziegler-Natta catalyst systems comprised of titanium tetrachloride/trialkyl aluminum, or other transition metals such as zirconium and vanadium in place of the titanium. These catalyst systems are well known in the art and more detail is not necessary to inform one skilled in the art.

While the aforesaid feed mixture is continuously circulated in the loop reactor, polymerization takes place at temperatures below the melting point of the polyethylene formed thereby producing a slurry of solid polyethylene particles in the liquid feed mixture. The reaction typically takes place at a temperature of from about 185 to about 220 degrees Fahrenheit (F.) at a pressure of from about 500 to about 650 psig. A slurry containing, among other things, HDPE and solvent is drawn off from the reactor either continuously or intermittently, as desired.

The loop reactors are normally formed from large diameter pipes, e.g., from about 10 to about 30 inches in inside diameter, and can be about 50 feet across with lengths of from about 250 to about 300 feet in length.

The slurry withdrawn from the reactor is processed for the removal of solvent for re-use in the reactor. The remaining solid polyethylene particles are then passed to a drying, mixing, extruding, and pelletizing system wherein the particles are converted to solid polyethylene pellets. The pellets are packaged and marketed as a product of the polyethylene production plant in which the foregoing process was carried out.

A high shear mixer such as a commercially available fifteen inch Farrell continuous mixer has been employed in this system. The operation of the mixer unit is to receive solid polyethylene powder at a temperature of from about ambient to about 140 F, and to mix this powder until the mixing action raises the temperature of the powder to a temperature of from about 360 to about 420 F, thereby melting the powder and forming a stream of molten HDPE.

The molten polymer is removed through an outlet orifice gate carried by the mixer and transferred through a chute/hopper conduit combination to an extruder unit in which the molten polymer is extruded as a first step toward making solid polymer pellets suitable for storage, packaging, and the like.

It is the orifice gate of the mixer in the drying, mixing, extruding, and pelletizing system to which this invention is directed. The extent of the mixing undergone by the polymer in the mixer determines the temperature of the polymer when it leaves the mixer and enters the outlet gate orifice.

Heretofore, the hinged gate inside the outlet orifice of the mixer carried a clevis at its lower end. This clevis was internally threaded and thereby connected to a threaded shaft end, the opposing end of this shaft being connected to an actuator.

Operation of the actuator moves the hinged orifice gate backward or forward, as desired.

Movement of the gate backward gradually opens the orifice further, thereby allowing a greater volume of polymer to leave the mixer through the outlet orifice. This shortens the residence time for the polymer in the mixer, and lowers the temperature of the polymer exiting the outlet orifice.

Movement of the gate forward gradually closes the orifice further, thereby allowing a lesser volume of polymer to leave the mixer through the outlet orifice. This retains the polymer in the mixer for a longer mixing time, and thereby raises the temperature of the polymer exiting the outlet orifice.

Thus, the orifice gate of the mixer is used to vary, as and when desired, the melt temperature of the polymer leaving the mixer. The orifice gate/actuator combination affords an infinite number of gate settings that control the amount of molten polymer leaving the outlet orifice in which the gate is movably carried. Accordingly, great flexibility is available in achieving the desired melt temperature of the polymer exiting the outlet gate orifice of the mixer.

In actual operation, frequent failure of the actuator shaft at its threaded end was experienced. This failure required that the polymer mixer be shut down, the mixer opened, the broken threaded portion in the lower part of the gate drilled out, and a new threaded shaft installed in place of the failed shaft. This repair work usually translated into 14 to 24 hours of mixer downtime and lost mixer production, an expensive loss.

Surprisingly, it was found that even though the actuator shaft was carried essentially horizontally between the actuator and the orifice gate, when the actuator was operated to move the gate forward, a net downward force was exerted on the threaded end of that shaft which caused the frequent failures of this type of shaft.

This invention addresses and corrects the failure mode of the aforesaid threaded actuator shafts.

SUMMARY OF THE INVENTION

Pursuant to this invention, there is provided a method and apparatus for operating a polymer mixer orifice gate which employs a flanged clevis that has a depression therein and a flanged actuator shaft that carries a matching protuberance so that when the flanges are fixed to one another, the protuberance slidably fits into the depression.

This arrangement was found to eliminate the net downward force on the clevis and the failure mode of the prior art threaded actuator shafts.

DETAILED DESCRIPTION OF THE INVENTION

Figure 1:
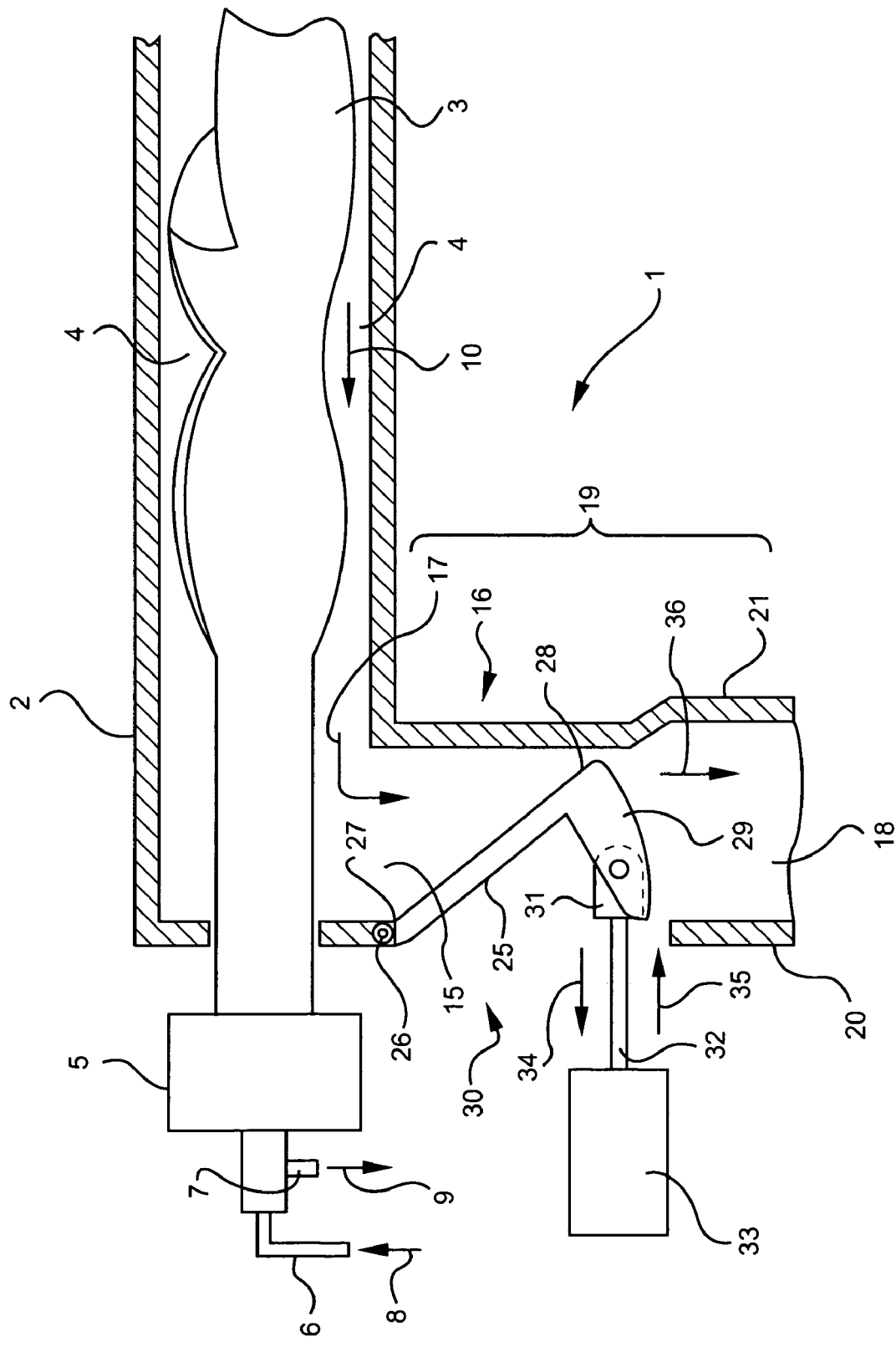
FIG. 1 shows a partial cross-section of a conventional polymer mixer and its relation with its outlet orifice gate assembly and actuator.

FIG. 1 shows a partial section of a typical prior art polymer mixer 1. Mixer 1 has an enclosed body 2 in which is carried a pair of vertically opposed mixing rollers, the lower of which is shown, in part, as element 3 in FIG. 1. This pair of rollers, upon rotation by a motor, not shown, imparts high shear mixing to the polymer carried in the inner volume 4 between body 2 and roller 3 in well known manner. Lower roller 3 is carried at its non-motor end by a bearing assembly 5. Cooling fluid is circulated through the interior of roller 3 by way of piping 6 and 7 as shown by arrows 8 and 9. For more details on mixer 1 as a whole and its mixing rollers see U.S. Pat. No. 7,392,988.

Rotation of roller 3 moves the polymer in the direction shown by arrow 10 toward an outlet window 15. Below window 15 an outlet orifice 16 is carried in a fluid communication manner with that window and interior 4 as shown by arrow 17.

Outlet orifice 16 has an upper polymer inlet at window 15 and a lower polymer outlet at 18. Between opposed inlet and outlets 15 and 18 extends an elongate, essentially closed hollow orifice body 19. Body 19 can have any desired cross-sectional configuration from circular to square and anything in between, but is normally square or rectangular. Whatever its cross-sectional configuration, body 19 has enclosing, opposing elongate sides. In FIG. 1 the cross-sectional configuration is, as an example, square so that opposing elongate sides 20 and 21 make up part of body 19.

An orifice gate 25 is carried essentially diagonally internally of body 16

The upper end 27 of orifice gate 25 is hinged at 26 to body 2 so that the lower end 28 of gate 25 can be moved toward or away from elongate side 21.

The lower end 28 of gate 25 carries a laterally extending member 29. Member 29 extends essentially laterally toward elongate side 20. Side 20 has an aperture 30 therein through which member 29 can be moved.

Member 29 carries at its terminal (free), distal end a hinged clevis 31.

Clevis 31 threadably engages one end of shaft 32 which shaft is carried by actuator 33 at its opposing end. Actuator 33 can be pneumatic, hydraulic or the like as desired. By operation of actuator 33, shaft 32, and, therefore, clevis 31 and lower end 28, can be moved toward or away from side 21 at will as shown by arrows 34 and 35.

In FIG. 1 shaft 32 is shown in an extended mode in the direction of arrow 35 thereby moving gate 25 to an essentially closed position which allows essentially no polymer to flow (arrow 36) to outlet 18. This is not a normal setting when the mixer is in operation. Typically, in operation, orifice gate 25 is maintained more than halfway open. The extent of the gate opening is regularly varied in operation in order to vary the melt temperature of outlet polymer 36. To open the orifice to allow for a greater volume of polymer 36 flow, actuator 33 is operated to move shaft 32 in the direction of arrow 34.

Figure 3:
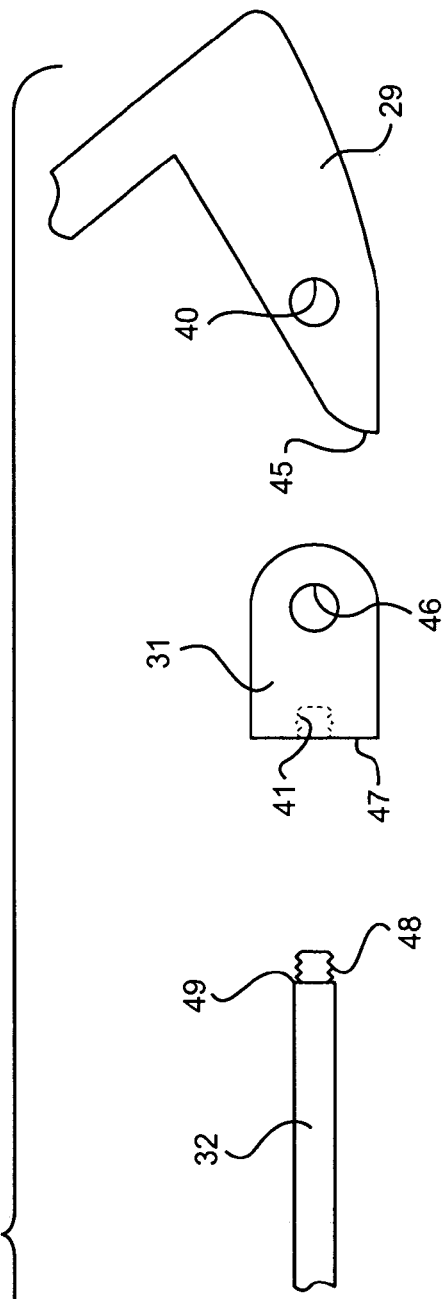
FIG. 3 shows an exploded view of the assembly of FIG. 2.

The cyclic movement of shaft 32 forward against molten, viscous polymer 17, and then backward, together with the unobvious net downward force on the shaft end that is threaded into clevis 31 resulted in stress cycling (cyclic fatigue) that caused the threaded end, element 48 in FIG. 3, to fail prematurely and regularly in the prior art equipment.

Figure 2:
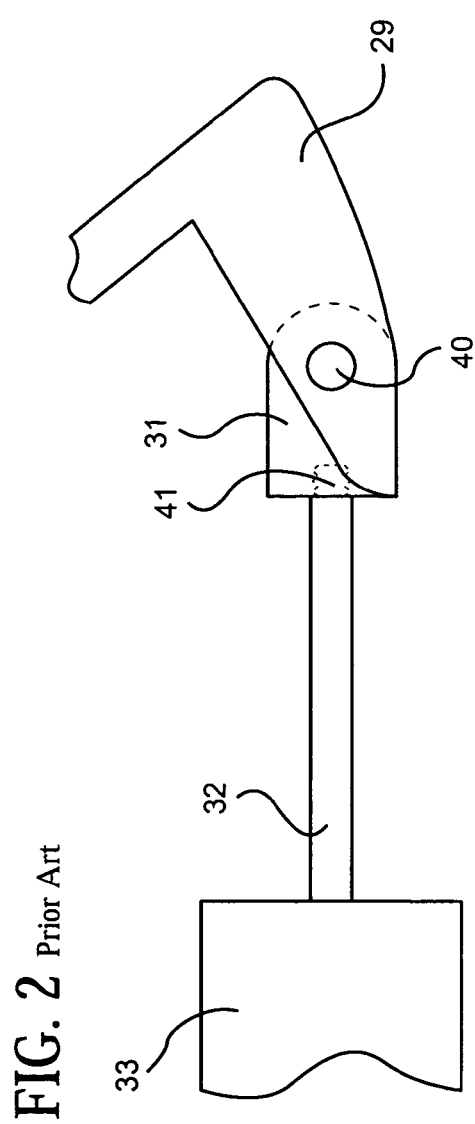
FIG. 2 shows a close-up of the prior art threaded actuator/shaft/clevis assembly.

FIG. 2 shows an enlarged view of the actuator 33/shaft 32/clevis 31/member 29 assembly, and better shows that clevis 31 is hinged to member 29 at 40. FIG. 2 also better shows that the distal end of shaft 32 is threaded into an interior threaded recess 41 of clevis 31.

FIG. 3 shows the assembly of FIG. 2 when disassembled. FIG. 3 shows distal end 45 of member 29 carrying hinge pin 40. Clevis 31 is shown to carry an aperture 46 that matches and receives pin 40 when assembled as shown in FIG. 2. The opposing end 47 of clevis 31 carries an internally threaded opening 41. Shaft 32 is shown to have an externally threaded shaft end 48 that is sized to threadably engage opening 41 until shaft face 49 abuts clevis face 47 as shown in FIG. 2. It is this threaded end 48 that failed in the prior art equipment due to stress cycling, and it is this type of failure that Applicant's invention eliminates.

Figure 4:
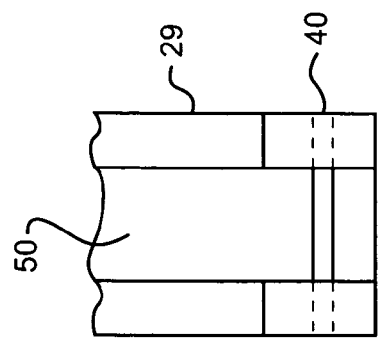
FIG. 4 shows an end view of the prior art clevis of FIGS. 1-3.

FIG. 4 shows an end view of clevis 31 with its slot 50 that is adapted to receive clevis 31 and allow aperture 46, FIG. 3, to align with and receive pin 40.

Figure 5:
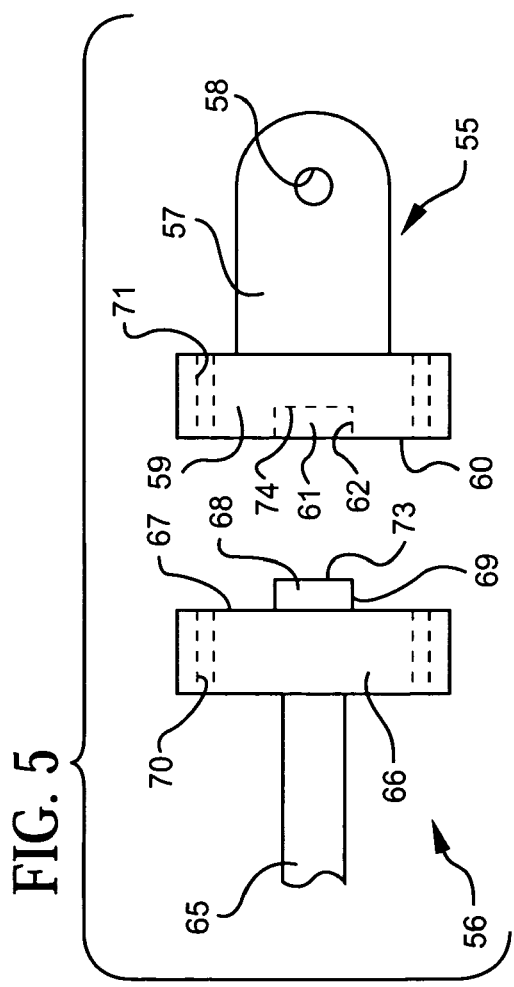
FIG. 5 shows one embodiment of the flanged depression/protuberance assembly of this invention.

FIG. 5 shows one embodiment of this invention wherein the threaded clevis of FIGS. 1-3 is replaced with a flanged clevis 55, and the threaded actuator shaft 32 of FIGS. 1-3 is replaced with a flanged actuator shaft 56.

More specifically clevis 55 is shown to have a normal clevis member 57 with an aperture 58 that aligns with and receives pin 40 as in FIGS. 1-3. However, clevis 55 carries at its opposing, shaft meeting end, flange 59. The terminal end 60 of flange 59 carries a depression 61 of finite depth 62.

Actuator shaft 65 carries at its distal end from actuator 33 a flange 66. Flange 66 carries at its terminal end 67 a protuberance (projection) 68 of finite depth 69.

Protuberance 68 is of a cross-section that allows sliding, mating bossed, movement into the interior of depression 61 up to its depth 69. Depth 69 can be equal to or somewhat less than depth 62. The cross-section of depression 61 and protuberance 68 can vary so long as a sliding fit is provided as faces 60 and 67 are brought into abutment and bolted together by way of holes 70 and 71. The cross-section can vary from circular to square or rectangular as desired.

Figure 6:
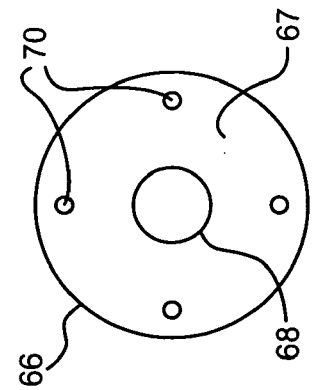
FIG. 6 shows the sliding mating of the protuberance and depression of the apparatus of FIG. 5 when assembled for operation by an actuator and its shaft.

FIG. 6 shows terminal face 67 of flange 66, and further shows that in this particular example protuberance 68 is essentially circular in configuration.

Figure 7:
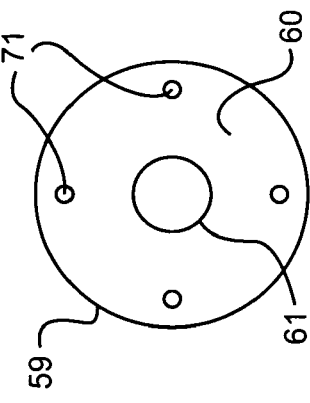
FIG. 7 shows the terminal end of the actuator shaft flange of FIG. 6.

FIG. 7 shows terminal face 60 of flange 59, and further shows that in this particular example depression 61 has a matching circular configuration that is just slightly larger in diameter than protuberance 68.

Figure 8:
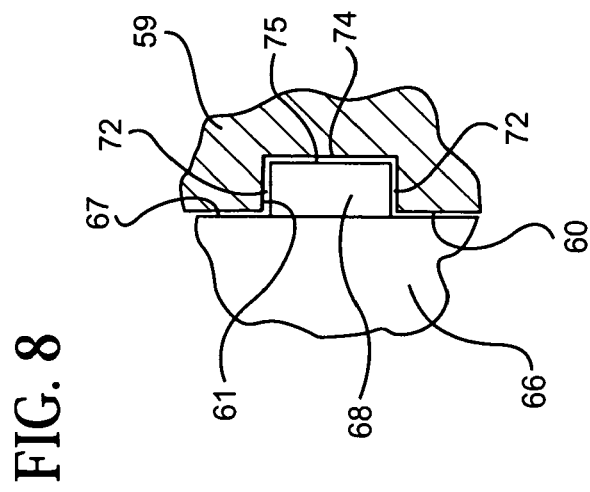
FIG. 8 shows the terminal end of the clevis flange of FIG. 6.

FIG. 8 shows the flanged shaft 56 and clevis 55 of FIG. 5 when flange faces 60 and 67 are brought into contact and fixed in that position for operation of mixer 1. In this operating configuration, protuberance 68 has slid into the interior of depression 61 up to its depth 69, FIG. 5, which positioning is maintained by flanges 59 and 66 being fixed to one another.

In FIG. 8, the transverse clearance 72 between an exterior side of protuberance 68 and an opposing internal wall of depression 61 can vary so long as stress cycling failure is eliminated, and can be in the range of from about one thousandth to about one tenth of an inch. The clearance 75 between end face 73, FIG. 5, of protuberance 68 and bottom face 74 of depression 61 can vary from essential abutment up to a finite clearance within the range of transverse clearance 72.

It was surprisingly found that even though flanges 59 and 66 are bolted to one another, there is still sufficient movement allowed between protuberance 68 and depression 61 to eliminate the net downward force on the assembly caused by movement of the actuator shaft, and thereby eliminate the problem of stress cycling failure at the point where the actuator shaft is fixed to the clevis.

It has also been surprisingly found that this invention increases the load carrying capability of the actuator shaft.

A substantial advantage for this invention is that the mixer need not be shut down should it become necessary to repair the actuator because the flanges allow the gate to be clamped in an open position.

I claim:

1. In a method for controlling the removal of heated polymer from a continuous polymer mixer, said mixer having an open elongate outlet orifice having an upper inlet adjacent said mixer and a distal lower outlet, said inlet and outlet being separated by an elongate length of an essentially closed hollow body that has a width transverse to said elongate length and at least first and second opposed elongate sides, an orifice gate carried in said hollow body, said orifice gate having upper and lower ends, said upper end being rotatably hinged at said first elongate side near said upper inlet, said orifice gate extending for a distance diagonally across at least a portion of said elongate length of said hollow body so that when said lower end of said orifice gate is gradually moved toward said second elongate side, said outlet orifice is gradually closed thereby gradually restricting the flow of polymer through said hollow body, said lower end of said orifice gate carrying a laterally extending member, said laterally extending member extending from said lower end of said orifice gate toward said first elongate side, said laterally extending member having a distal end opposing said first elongate side, said first elongate side having an aperture through which said distal end of said laterally extending member can pass, the improvement comprising rotatably mounting to said distal end of said laterally extending member a first end of a clevis pin, said clevis pin having a distal end that carries a first flange, said first flange having an exposed terminal end, said first flange having a depression in said exposed terminal end, providing a shaft having first and second ends, said first end of said shaft carrying a second flange, said second flange having an exposed terminal end that mates with said first terminal end of said first flange, said second flange carrying at its terminal end a protuberance that fits into said depression in said first flange, fixing said first and second flanges to one another with said protuberance mating with said depression in a sliding fit, attaching said second end of said shaft to an actuator, and employing said actuator to move said lower end of said orifice gate toward or away from said second elongate side.

2. The method of claim 1 wherein said laterally extending member extends essentially across said width of said hollow body when said lower end of said orifice gate is near said second elongate side.

3. The method of claim 1 wherein said depression is a circular hole having a finite depth, and said protuberance is a circular projection that has a sliding fit in said depression when said first and second flange members are fixed to one another.

4. The method of claim 1 wherein said projection and hole fit with a transverse clearance of from about one thousandth to about one tenth of an inch.

5. In continuous polymer mixing apparatus having an open elongate outlet orifice having an upper inlet adjacent said mixer and a distal lower outlet, said inlet and outlet being separated by an elongate length of an essentially closed hollow body that has a width transverse to said elongate length and at least first and second opposed elongate sides, an orifice gate carried in said hollow body, said orifice gate having upper and lower ends, said upper end being rotatably hinged at said first elongate side near said upper inlet, said orifice gate extending for a distance diagonally across at least a portion of said elongate length of said hollow body so that when said lower end of said orifice gate is gradually moved toward said second elongate side said outlet orifice is gradually closed thereby gradually restricting the flow of polymer through said hollow body, said lower end of said orifice gate carrying a laterally extending member, said laterally extending member extending from said lower end of said orifice gate toward said first elongate side, said laterally extending member having a distal end opposing said first elongate side, said first elongate side having an aperture through which said distal end of said laterally extending member can pass, the improvement comprising a clevis pin rotatably mounted to said distal end of said laterally extending member at first end of, said clevis pin having a distal end that carries a first flange, said first flange having an exposed terminal end, said first flange having a depression in said exposed terminal end, providing a shaft having first and second ends, said first end of said shaft carrying a second flange, said second flange having an exposed terminal end that mates with said first terminal end of said first flange, said second flange carrying at its terminal end a protuberance that fits into said depression in said first flange, said first and second flanges being fixed to one another with said protuberance mating with said depression in a sliding fit, and said second end of said shaft being attached to an actuator to move said lower end of said orifice gate toward or away from said elongate side.

6. The apparatus of claim 5 wherein said laterally extending member extends essentially across said width of said hollow body when said lower end of said orifice gate is near said second elongate side.

7. The apparatus of claim 5 wherein said depression is a circular hole having a finite depth, and said protuberance is a circular projection that has a sliding fit in said depression when said first and second flange members are fixed to one another.

8. The apparatus of claim 5 wherein said projection and hole fit with a transverse clearance of from about one thousandth to about one tenth of an inch.

* * * * *